United States Patent [19]
Medlar

[11] 3,713,339
[45] Jan. 30, 1973

[54] SENSING APPARATUS FOR MEASURING THE TEMPERATURE OF A HEATED RUBBER MATERIAL DURING ITS CURING PROCESS AND METHOD FOR MAKING SAME

[75] Inventor: Lewis A. Medlar, Orland, Pa.
[73] Assignee: Honeywell Inc., Minneapolis, Minn.
[22] Filed: Oct. 12, 1971
[21] Appl. No.: 188,268

[52] U.S. Cl. ............... 73/359, 136/230, 260/79.5 P
[51] Int. Cl. ......................... G01k 1/08, G01k 7/00
[58] Field of Search ...... 73/359; 260/79.5 P; 136/230

[56] References Cited

UNITED STATES PATENTS

| | | | |
|---|---|---|---|
| R26,409 | 6/1968 | Hance | 73/359 |
| 1,837,853 | 12/1931 | De Florez | 73/359 |
| 2,525,439 | 10/1950 | Abbot | 136/230 X |
| 3,524,983 | 8/1970 | Voelz | 73/17 R X |
| 3,649,729 | 3/1972 | Davis et al. | 73/15 R X |

*Primary Examiner*—Louis R. Prince
*Assistant Examiner*—Frederick Shoon
*Attorney*—Arthur H. Swanson et al.

[57] ABSTRACT

A uniquely constructed sensing apparatus is provided to
1. continuously and more accurately sense the temperature of a heated rubber material in a mold than has heretofore been possible,
2. reduce the curing time that has heretofore been required to heat a raw rubber material to a cured state and to
3. sense the instant of time when a heated raw rubber material being cured in a mold reaches a cured state and thereby eliminate the costly present practice of overheating to make sure that the rubber material is properly cured.

9 Claims, 6 Drawing Figures

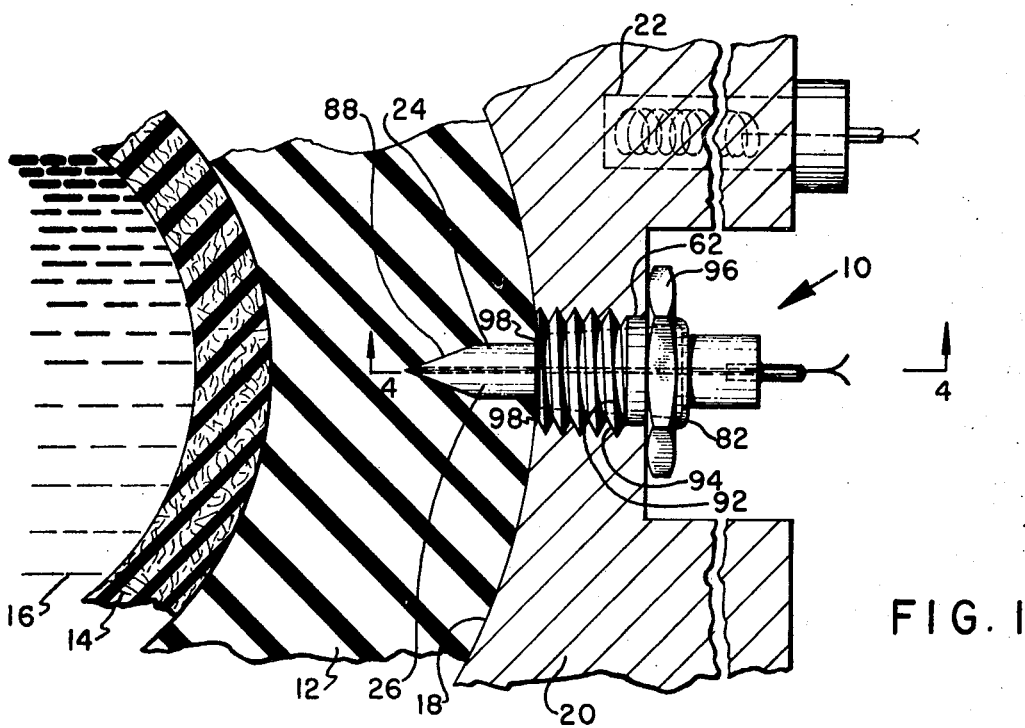
FIG. 1
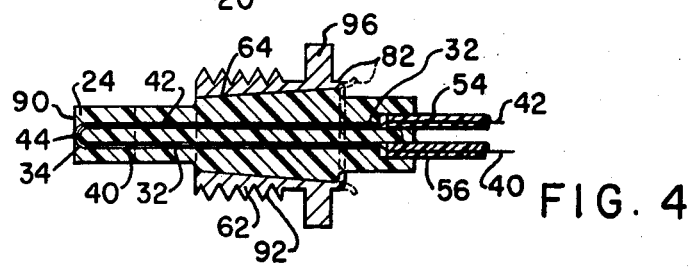
FIG. 4
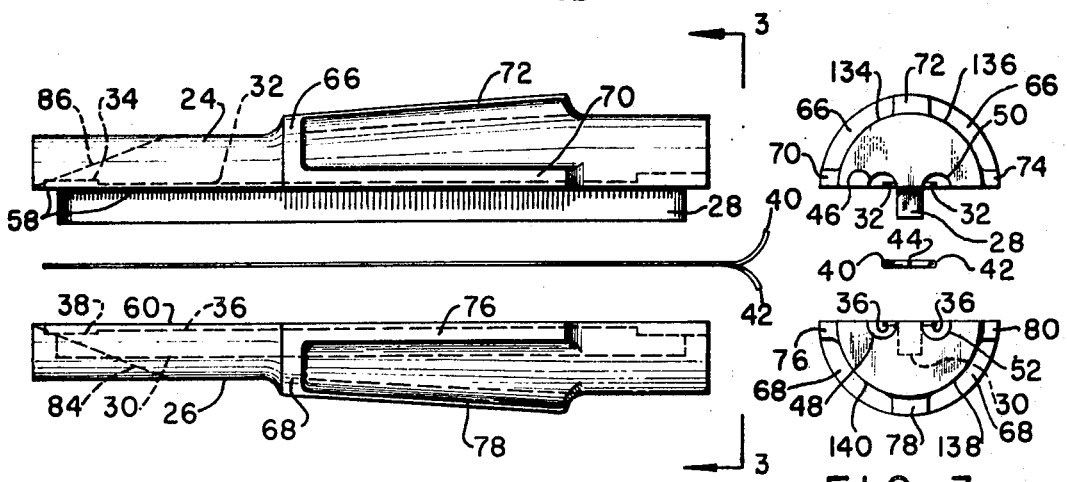
FIG. 2
FIG. 3
INVENTOR.
LEWIS A. MEDLAR

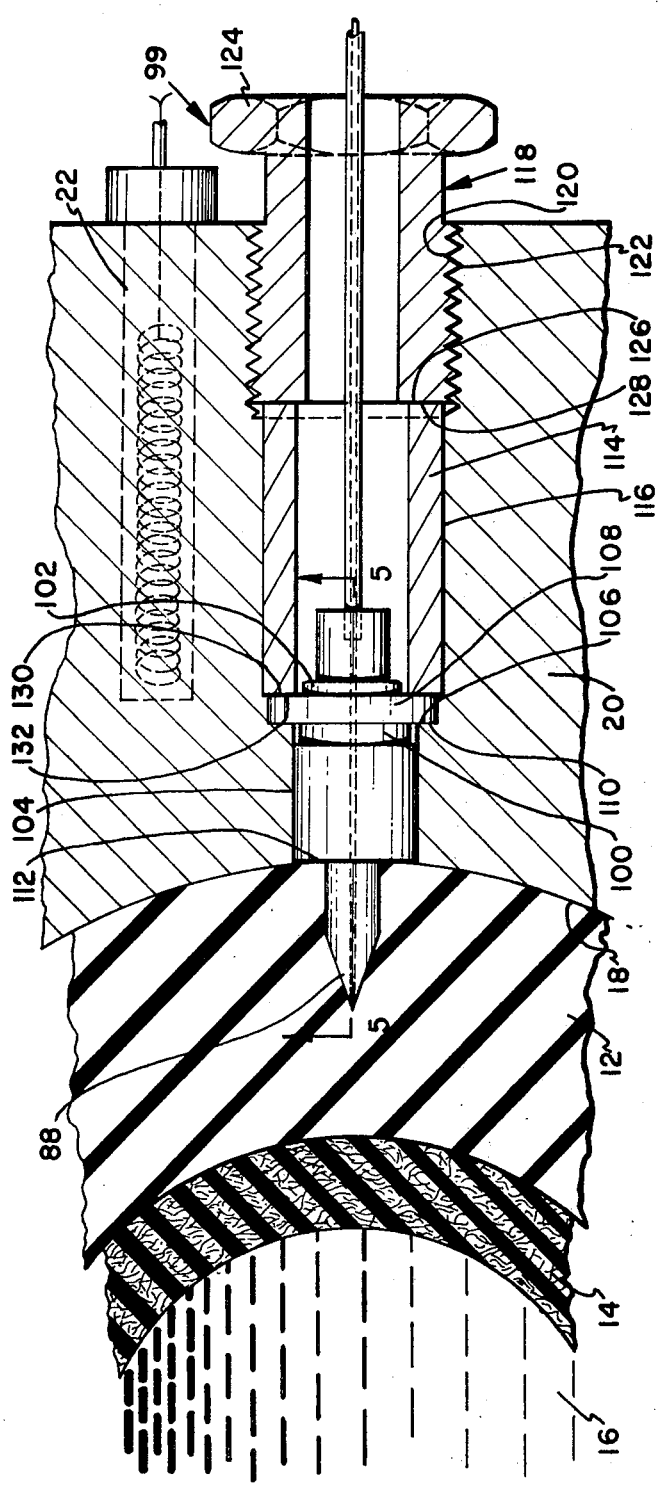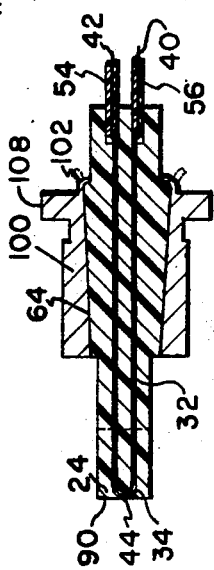
INVENTOR.
LEWIS A. MEDLAR
BY John Shaw Stevenson
AGENT

SENSING APPARATUS FOR MEASURING THE TEMPERATURE OF A HEATED RUBBER MATERIAL DURING ITS CURING PROCESS AND METHOD FOR MAKING SAME

BACKGROUND OF THE INVENTION

The first step in the manufacture of a tire is to place peripheral and side wall surfaces of a ring of raw rubber and other associated ingredients having similar physical characteristics against a stationary heated tire mold. An expandable bag is brought into contact with the inner peripheral wall of the raw rubber and hot liquid or steam is forced into the bag under pressure to allow the bag and the raw rubber to be expanded in a radial outward direction against the mold to shape the ring of raw rubber into the form of a tire.

As heat continues to be applied to the raw rubber in the aforementioned manner, and to the mold, it will be gradually changed from an uncured or soft non-resilient dough-like state that is subject to an abnormally short life due to its poor wear resistance into a cured smooth resilient state which has a desired long wear resistance characteristic.

It is therefore necessary to provide a sensing apparatus which can be mounted on a mold and project into the rubber material in the mold so that an accurate indication of the temperature of this rubber material can continuously be sensed during the curing process in order that the exact instant of time when the rubber material passes from an uncured to a cured state can be ascertained.

PROBLEM

Experience has shown that tires which are not sufficiently cured fail and must be replaced by tire manufacturers because they have an abnormally short life due to their poor wear resistance characteristics. It has heretofore been difficult for rubber tire manufacturers to determine the instant of time the heated rubber material in a mold is changed from an undesired, uncured state to a desired, cured state because the sensors that have heretofore been used could not be relied upon to give an accurate measurement of the rubber material being cured in the mold and hence the degree of curing that had taken place at any instant of time in the curing process.

DESCRIPTION OF PRIOR ART

Because of the inability of manufacturers of rubber tires to provide a sensing apparatus that will tell them the exact instant of time that the curing of a tire takes place in a mold, they have been required to go to the added expense of over curing tires and other rubber products by allowing the curing time to extend beyond the instant of time in which the heated rubber product is changed from a uncured to a cured state.

Not only is the additional time to over cure expensive to the tire manufacturer but it also prevents the product quality of the rubber tire from being maintained at an optimum value.

ANALYSIS OF THE PROBLEM

To overcome the previously referred to problem, a complete study of the previously mentioned curing process of the heated tire mold was made.

It was found that the reason why it was not possible to obtain an accurate reading of the temperature of the rubber being cured was due to the fact that when electrically conducted leads of a thermocouple are employed as part of the sensor, these leads passed through a part of the mold which was of a higher temperature than the tip of the thermocouple that was employed to sense the temperature of the rubber in the mold. Since the rubber material whose temperature is sensed has a relatively low heat conductivity and since the thermocouple leads were of a highly conductive metal material, undesired heat is therefore carried from the mold to the tip of the sensor by the leads and causes an undesired error in the temperature of the rubber material under measurement to be sensed.

SUMMARY OF THE INVENTION

A sensing apparatus comprising a thermocouple having:

1. a relatively large contact surface with the rubber whose temperature is under measurement so that changes in the heat emitted by the rubber can be immediately sensed by the tip of the thermocouple;

2. thermocouple leads that are of an extremely small diameter and of an abnormally long length so that undesired heat can not flow through the leads toward or away from the tip of the thermocouple;

3. an abnormally large amount of thermal insulation between the leads and the high heat region of the mold to thereby minimize heat flow to the thermocouple tip from any other source than the rubber under measurement.

A better understanding of the present invention may be had from the following description when read in connection with the accompanying drawings, in which:

FIG. 1 is a view showing how the aforementioned uniquely constructed thermocouple sensor can be mounted on a curing mold and how it extends into a heated rubber material retained therein;

FIG. 2 shows an exploded side elevation view of the thermocouple leads and a two part insulator housing surrounding these leads before these two parts are formed into a unitary structure shown in FIG. 1;

FIG. 3 shows an end view taken along line 3—3 of FIG. 2;

FIG. 4 shows a sectional view taken along lines 4—4 of the assembled unitary structure of FIG. 1 and a bushing thereon which is employed to threadedly mount this sensor structure in a desired position in a mold as shown in FIG. 1;

FIG. 5 is a preferred modified form of the sensor showing the same two part housing as that shown in FIG. 2 and a bushing that is of a different form than that shown in FIG. 1 and 4; and FIG. 6 shows a preferred embodiment taken along the line 5—5 in FIG. 6 of the temperature sensing apparatus having an adjustable threaded adapter to retain the two part housing and bushing shown in FIG. 5 in a tire mold.

FIG. 1 shows a sensor 10 for accurately sensing the temperature of a selected portion of a gob of heated rubber 12 that is positioned between the outer wall of an expandable bag 14 that contains steam or hot liquid 16, and the inner wall 18 of the tire mold 20 about which heat from, for example, an electric heater 22 is applied thereto.

The sensor 10 is comprised of a two part housing 24, 26 as is best shown on FIGS. 2 and 3. These housing parts 24 and 26 are preferably made of a temperature resistant material, for example, Diallylpthalate or Polysulfone that can withstand the temperature of the heat dissipated by the hot steam 16 and heater 22 which causes the temperature of the steel tire mold 20 to reach 380° Fahrenheit.

The upper housing part 24 contains a rib portion 28 that is constructed to fit snugly into a wall forming a substantially rectangular shaped slot 30 in the lower housing part 26.

The upper housing part 24, as is best shown in FIGS. 3 and 4, has a slotted out wall portion 32 that extends along its bottom surface and on either side of its rib portion 28 as well as having a connecting left end portion 34 extending about the left end of the rib portion 28 and which is of a greater depth than the slot 32.

The lower housing part 26, as is best shown in FIGS. 2 and 3, has a slotted wall portion 36 that extends laterally away from the top of the wall forming the rectangular shaped slot 30 and also has a left end portion 38 that is of a greater depth than the slotted wall portion 36.

Before moving the rib 28 of the upper housing part into engagement with the slotted wall portion 30 in the lower housing, a pair of very fine heat conducting leads 40, 42 that are joined together at their left end to form a hot junction 44 are inserted into the U-shaped slotted wall portion 36, 38 formed in the lower housing member 26.

When the rib 28 of the upper housing member 24 is lowered into engagement with the wall portion which forms the rectangular shaped slot 30 a small chamber will be formed by the then aligned slotted out portions 32, 36 and 34, 38 about their leads 40, 42.

The right ends of the upper and lower housing members 24, 26 have aligned recessed portions 46, 48, 50, 52 that form enlarged portions of the pair of recesses 32, 36, 32, 36 so that the leads extending therefrom can be protected by suitable insulating sleeves 54, 56 from the heat surrounding this end of the sensing apparatus 10.

Before joining the two halves of the housing 24, 26 together, the surfaces of the housing, for example, 58, 60 which are brought into contact with each other when they are assembled, and all other contacting surfaces, are coated with a suitable epoxy cement.

After the housing parts 24, 26 containing thermocouple wires 40, 42 are joined together and before the cement hardens and forms a unitary body, a bushing 62 having inner tapered wall 64 is forced over the outer left end of the assembled housing 24, 26. This action continues until the tapered wall surface 64 is brought into snug contact with a major portion of the tapered rib surface portions 66,68,70,72,74,76,78,80 formed on the housings 24, 26.

The cylindrical left end 82 of the bushing 62 is then peened over and thereby moved from its dotted to its solid line position about the right ends of the ribs 70, 72, 74, 76, 78, 80 as shown in FIG. 4. This operation will thus cause the upper and lower housing parts 24, 26 to be compressed toward one another before the epoxy between their contacting surfaces has hardened so that a fluid tight joint will be formed between the surfaces when the epoxy cement is completely hardened.

After the epoxy cement has hardened, the left ends of the upper and lower housings 24, 26, shown in FIG. 2, are sheared along the lines 84, 86 to form a chisel shaped end 88 as shown in FIG. 1 for piercing the right side of the rubber 12 to the desired depth where a temperature measurement can be made.

FIGS. 1 and 4 show that the chisel end portion 88 terminates in a dull point 90 which contains the exposed hot junction temperature sensing end portion 44 of the sensor 10. The thermocouple hot junction 44 and its associated leads 40, 42 which are either 0.010 inches or less thermocouple wire or equivalent thick film or vacuum deposited metal, can alternatively be replaced with a diode sensing element, not shown, that has leads for supplying a constant current to same and a pair of EMF leads to transmit the electrical signal from the diode that is proportional to the temperature of the rubber that it is is employed to sense.

Although the sensing element has been described as being a thermocouple having a hot junction 44 and leads 40, 42 extending therefrom, it should be understood that a thermistor, not shown, which has suitable leads extending therefrom could be employed to equal advantage.

If it is desired to use a different pure film or vacuum deposited metallic material in place of the wire leads 40, 42, the slotted wall portions 46, 52 could be eliminated.

The advantage gained from either of the aforementioned two thick film or vacuum deposit leads, is that a still further reduction in the undesired thermal losses through the leads 40, 42 would be realized.

When the epoxy cement joining the tire parts 24, 26 of the sensing apparatus 10 has dried after being mounted for a period of time in a fixed position in the bushing 62, the threads 92 on the outer portion of bearing 62 are screwed into the threaded wall portion 94 formed in the heated mold 20. This is done by rotating the hexagonal finger gripping portion 96 and rotating the now completely assembled unitary sensing apparatus 10 into the position shown in FIG. 1.

The bushing 62 is required to be rotated until its inner flat ring surface 98 and the left side surface of ribs 66, 68 are flush with and form a continuation of the inner wall portion of the mold 20 to thereby prevent the rubber 14 from leaving the mold 20. This position will only occur when the tip of the sensor is in a single position.

The preferred construction for the sensing apparatus 99, shown in FIGS. 5 and 6, is employed when it is desired to position the temperature sensing chisel shaped end 88 in a mold 20 at any one of a number of different angular positions which may extend between 0° and 360°.

This is made possible by employing the same thermocouple lead wires 40, 42 between two parts 24, 26 and using epoxy cement to join these parts together in the same manner as that previously set forth under the description of FIGS. 1 – 4.

Before the epoxy cement is dried, a bushing 100 having an inner wall portion tapered similar to the outer wall of the parts 24, 26 is forced over the part 24, 26 and the right end portion 102 of this bushing 100 is peened over the right end of ribs 70 – 80 in a manner similar to that previously described for the end portion 82 of the bushing 62 as was set forth under the description of FIG. 4.

The outer peripheral surface of the bushing 100 is slid into the cylindrical bored out wall portion 104, as shown in FIG. 6, until the left surface 106 of its right end portion 108 contacts the cylindrical bored out surface 110 of the mold 20.

The flat cylindrical left end surface 112 of the bushing 100 acts as an inner surface of the mold 20 which, along with its associated chisel shaped end 88, can be rotated to any desired angular position in the mold 20.

Once the desired angular position of the chisel shaped end is selected, a cylindrical sleeve 114 is slid along the bored out cylindrical surface 116 of the mold 20.

The left end of the cylindrically shaped retaining member 118 contains threads for moving it along the threaded portion 122 formed in the mold 20 to the position shown in FIG. 6. This can be done by manually gripping and rotating the right hexagonal end 124 of the member 118.

The left flat end 126 of the retainer member 118 can thus be brought into compressed surface to surface contact with the right end 128 of the sleeve 114 and the left end 130 of the sleeve 114 can be simultaneously brought into compressed physical contact with the right end surface 132 of the bushing 100. Since the left end surface 132 of the bushing 100 is forced against the wall 110 of the mold 20, and since the remaining parts of the sensing apparatus is integral with the bushing 100, the selected position to which the chisel point of the sensor was positioned will therefore be retained against movement in that selected position.

It should be noted that when the sensing apparatus 10 or 99 are respectively assembled as shown in FIG. 1 and FIG. 6, that the recessed wall portions 134, 136, 138, 140, shown in FIG. 3, will be used to form air retaining chambers between such successive pair of rib portions 70 – 72; 72 – 74; 80 – 78; 78 – 76, their associated end ribs 66, 68 and the peened over end part 82. The air being retained in the aforementioned manner in the recessed wall portions 134 – 140 will act as an insulator and prevent undesired heat which is emitted by the mold 20 from affecting the temperature signal being transmitted through the lead wires 40, 42 from the tip of the sensor 44 where the temperature of the material 12 retained in the mold is being sensed.

It should also be understood that the aforementioned conductive leads 40, 42 are provided with insulation when the two insulator parts 24, 26 are joined together because of the insulating characteristic of the epoxy cement which then fills the voids that surround these leads 40, 42.

The embodiments of the invention in which an exclusive property or privilege is claimed are defined as follows:

1. A temperature sensing apparatus adapted for mounting in a curing mold to sense the temperature of the material being heated therein without the heat from said mold affecting the temperature being sensed by said apparatus, comprising two heat insulating members, the first one of said members having a wall forming a recess therein and a means to accommodate the positioning of an electrically conductive temperature sensing element in said first member and in spaced relationship from the wall forming said recess, the second of said insulating members having a rib positioned to protrude into said recess formed by said wall in said first member, said electrically conductive temperature sensing element having a temperature sensing end portion positioned between two common end portions of said insulating members that are insertable into said material, and a bushing positioned about and in contact with said members to retain them in fixed relationship with one another.

2. The temperature sensing apparatus as defined in claim 1 wherein tapered ribs are formed along an outer surface of said insulating members and the inner surface of said bushing is of a tapered configuration to fixedly engage said outer surface of said tapered ribs.

3. The temperature sensing apparatus as defined in claim 1 wherein tapered ribs are formed on an outer surface of said insulating members, the inside surface of the bushing is constructed of a tapered configuration to fixedly engage said outer surface of said tapered ribs and to be held in a unitary relationship therewith and wherein one end of said bushing is retained in peened over relationship with an end portion of said tapered ribs.

4. The temperature sensing apparatus as defined in claim 1 wherein the outer surface of said bushing has threads formed thereon that are adapted to be inserted in fluid tight engagement with a bored out threaded wall which passes through the curing mold.

5. The temperature sensing apparatus as defined in claim 1 wherein the bushing and insulating members retained therein are constructed for insertion in any one of a number of angularly displaced positions in a wall forming a passageway through the curing mold while its associated temperature sensing end portion is simultaneously positioned at a similarly displaced location in the material being retained by said mold.

6. The temperature sensing apparatus as defined in claim 1 wherein the outer surface of the bushing is cylindrical and constructed for insertion in any one of a number of different selected angularly displaced positions in a bored out wall passing through said curing mold, and a mechanically adjusted means is employed between the bushing and the mold to retain the temperature sensing end portion in any one of said angularly displaced positions in said material.

7. The temperature sensing apparatus as defined in claim 1 wherein the surfaces of the two insulating members containing the recess and said rib are cemented in fixed fluid tight relationship with one another.

8. The temperature sensing apparatus as defined in claim 1 wherein the surfaces of the two insulating members containing the recess and said rib are cemented in fixed fluid tight relationship with one another and wherein a pair of adjacent ends of each of the two insulating members converge toward one another and toward an exposed part of the temperature sensing end portion to facilitate the insertion of the temperature sensing end portion into the material retained by said mold.

9. The temperature sensing apparatus as defined in claim 1 wherein the temperature sensing apparatus is adapted for mounting in a selected position in the curing mold for detecting the exact instant of time when raw rubber in said mold is changed to a cured state, said temperature sensing apparatus further comprising spaced apart rib portions and a series of recessed wall portions therebetween formed along an outer longitudinal portion of each of said insulating members, said assembled members having a circular rib extending between one end portion of each of said first mentioned ribs to close off one end of said recessed wall portions, the wall of said bushing being operable to close off the top of said recessed wall portions and a peened over end portion being operable to close off another end of said recessed wall portions and said air being trapped within the confines of said recess being employed to act as an insulator to prevent undesired heat from the mold from affecting the temperature signal being transmitted by said temperature sensing end portion.

* * * * *